Nov. 22, 1932.  O. D. H. BENTLEY  1,888,485
ELASTIC FLUID TURBINE
Filed Feb. 14, 1930
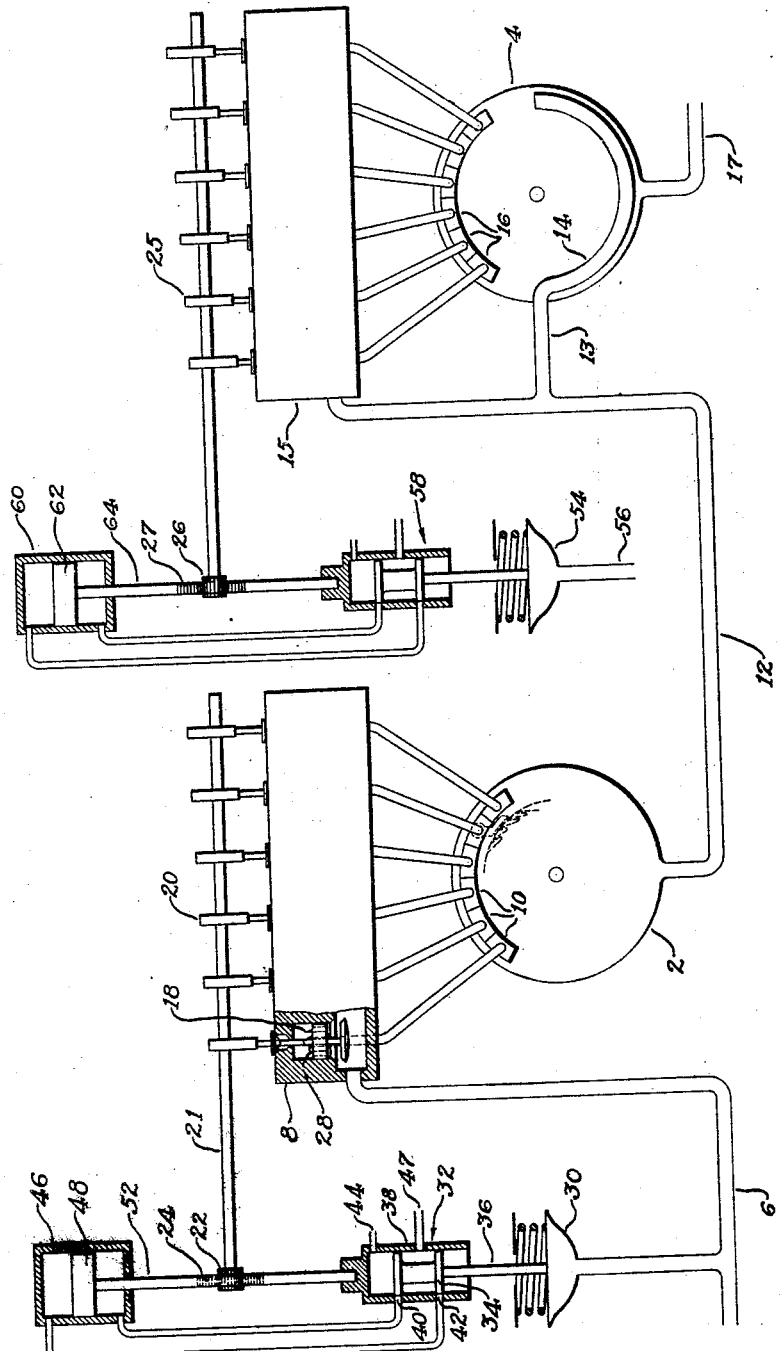
Witness
Paul F. Bryant
Inventor
Oliver D. H. Bentley
by his attorneys
Van Everen, Fish, Hildreth & Cary Patented Nov. 22, 1932

1,888,485

UNITED STATES PATENT OFFICE

OLIVER D. H. BENTLEY, OF NORFOLK, MASSACHUSETTS, ASSIGNOR TO B. F. STURTEVANT COMPANY, OF HYDE PARK, MASSACHUSETTS, A CORPORATION OF MASSACHUSETTS

ELASTIC FLUID TURBINE

Application filed February 14, 1930. Serial No. 428,499.

The present invention relates to elastic fluid turbines and more particularly to apparatus and methods for controlling the operation of the auxiliary turbines used for driving the mechanical draft fans of a power plant.

According to the present invention, the forced and induced draft fans for a furnace are driven by separate turbines which are compounded, that is, connected for series operation. The steam is admitted to the induced draft fan turbine at high pressure and exhausted therefrom at an intermediate pressure into the forced draft fan turbine which itself exhausts at a lower pressure. The draft produced by the induced and forced draft fans is controlled by varying the speeds of their respective turbines in accordance with changes in the load on the plant. This variation in speed is conveniently controlled by variations in the steam pressure which tends to fall as the demand on the plant increases and to rise when the demand decreases.

In addition to the necessity for controlling the total draft produced by the fans, it is desirable that the division of load between the fans be such at all times as to maintain a substantially constant pressure (usually a fraction of an inch below atmosphere) in the combustion chamber of the furnace. In the method of control of both turbines by boiler pressure alone, there is no positive assurance of such division of load that the furnace pressure will be maintained constant at all times. Accordingly, the present invention provides a supplemental control operated by variations in furnace pressure to vary the proportions of power handled by the separate turbines. Thus, the total power required to furnish the draft for the plant is directly controlled by some factor which varies with the load on the plant, while the relative proportions of such total power handled by the two draft turbines are so varied as to hold the furnace pressure at a fixed or nearly fixed value.

The invention contemplates as a further feature the combination of a demand control operating to vary the power of both turbines in unison to effect variations in the total draft, together with a furnace pressure control operating to produce opposite effects in the two turbines. Thus, while the demand control operates partially to speed up or slow down both turbines together, a change in furnace pressure, on the other hand, acts to vary the division of power between the turbines, by varying the steam pressure between them, thus acting to increase the power of one, while effecting a compensating decrease in the power of the other. In the best form of the invention yet devised, the demand control operates to vary the total power without appreciably varying the division of power, while the furnace pressure control operates to vary the division of power, while maintaining the total power constant.

Other features of the invention consist in certain novel features of construction and modes of operation hereinafter described and particularly defined in the claims.

The accompanying drawing illustrates in somewhat diagrammatic manner the forced and induced draft fan turbines of a power plant and the apparatus for controlling the turbines in accordance with the present invention.

The illustrated embodiment of the invention comprises two turbines—first, a turbine 2 for operating the induced draft fan, and second, a turbine 4 for operating the forced draft fan. These turbines are respectively termed the induced draft and the forced draft turbines. The turbines are compounded, that is to say, the steam is passed in series through first the induced draft turbine 2 and then through the forced draft turbine 4. To this end, steam from the boiler or superheater is passed through the main 6 to the valve chest 8 of the induced draft turbine 2, and thence to the nozzles 10. The exhaust steam from the induced draft turbine is conducted through the steam line 12, and a part of it is introduced directly through the branch line 13 to a set of nozzles of the forced draft turbine, as indicated by the manifold 14. The remainder of the steam passes to the valve chest 15 which controls the supply of steam to the individual nozzles 16 of the forced draft turbine 4. This latter turbine exhausts at any suitable pressure into the exhaust line 17.

In the usual plant, the induced draft fan ordinarily takes the major proportion of the power required for draft. Therefore, the power supplied to the induced draft turbine will exceed that supplied to the forced draft turbine. Thus, under normal operating conditions, the steam may be admitted to the valve chest 8 at a pressure of 400 pounds and exhausted from the turbine 2 into the turbine 4 at a pressure of 85 pounds, and finally exhausted from the turbine 4 at about atmospheric pressure. As shown in the drawing, the induced draft turbine employs six nozzles which are individually controlled through the valve chest 8. The forced draft fan employs six individually controlled nozzles 16 and also a bank of twelve nozzles connected with the manifold 14 and independent of the valve control. The high pressure drop through the induced draft turbine gives high power through a small number of nozzles; the smaller steam pressure available for the forced draft turbine requires a much larger number of nozzles to develop relatively less power.

As shown in the diagram, the control of power supplied to each turbine is effected by variation of a number of nozzles in service. Accordingly, the valves 18 which control the supply of steam to the nozzles 10 are operated by cams indicated at 20. The cams 20 are mounted on the cam shaft 21 which is driven by a gear 22 engaging with a rack 24. Similarly, the valves for the forced draft turbine are operated by cams 25 driven by a gear 26 from a rack 27. The cams are so arranged that upon rotation of the shafts, successive nozzles are cut into service. Each valve is a combination sleeve and poppet valve adapted to admit steam to its corresponding nozzle through a triangular port 28, which is covered to a greater or less degree by movement of the valve. The controlled nozzles should be sufficient in number to permit small variations without excessive throttling. In practice, six controlled nozzles for each turbine have been found sufficient; although some throttling may occur on the last nozzle placed in service, its effect is practically negligible.

The supply of steam to the turbines is primarily controlled by some factor which varies in accordance with changes of the load on the plant. For this purpose, the steam pressure affords a convenient control. To this end, the steam main 6 connects with a spring loaded diaphragm 30 which operates a pilot regulator indicated generally at 32.

Briefly, the regulator 32 comprises a movable balanced piston 34 connected by a link 36 with the diaphragm 30. The piston slides in a casing 38 which has an upper valve port 40 and a lower valve port 42, both of which are normally covered by the ends of the piston, and is also provided with the vent port 44. The upper port 40 connects by means of a flexible pipe with the lower end of a control cylinder 46 and the lower port 42 similarly connects with the upper end of the cylinder. Liquid under pressure is supplied to the interior of the casing 38 through a pipe 47. The cylinder 46 carries a piston 48 provided with a connecting rod 52 on which the rack 24 is formed. The casing 38 of the pilot regulator is suspended on the connecting rod 52.

The pilot regulator 32 operates, as is well known, in such a way that opening of one or the other of the ports 40 and 42 causes the piston 48 to be moved up or down and thereby to rotate the cam shaft to operate the turbine nozzle valves. As the cams rotate (say, in an opening direction) they successively open the valves 18 of the individual nozzles 10. After one valve is fully open, the next is started, and so on, until at full load, all six nozzles are open. This action increases the total steam supplied to the entire system without, however, appreciably varying the division of power between the turbines or the steam pressures existing at intermediate points in the system; if for example, after operating with one of the nozzles 10 in service, another nozzle 10 is opened, the steam supply through the whole system is doubled, the power of the induced draft turbine is doubled, and the power of the forced draft turbine is also doubled.

It is a noteworthy fact that the turbines follow together in unison and with proportionate increases of power, by a change in the induced draft turbine nozzles alone and without the necessity of regulating the forced draft turbine. This is an important feature of the present invention and follows from the fact that when the back pressure on the nozzles of the induced draft turbine is less than about 58% of the initial pressure, the total steam flow through the system is completely determined by the aggregate throat area of the nozzles of the induced draft turbine, regardless of the nozzle area of the forced draft turbine.

So long, therefore, as the back pressure is less than the critical pressure, unison control of the turbines may be afforded by variations in the induced draft turbine alone. In the example cited above, wherein the initial and back pressures on the induced draft turbine are respectively 400 pounds and 85 pounds, this condition is satisfied.

It is to be emphasized that the use of a back pressure less than the critical pressure is not an essential, although it is a desirable feature of the invention. It is desirable in that it permits operation of the induced and forced draft fans in substantial unison and therefore tends to maintain the furnace pressure practically constant at all loads. If, however, the back pressure is greater than 58% of the initial pressure, an increase of the nozzle area of the induced draft turbine will not produce a proportionate increase in the quantity of steam and will not produce proportionate increases in the power supplied to the two turbines. The division of power will therefore vary and the furnace pressure will deviate from its predetermined value, thus placing a greater duty on the furnace pressure control which is now to be described.

Assuming the condition of a back pressure less than the critical pressure as in the preferred form of the invention, it will be evident that in the ideal theoretical case, the furnace pressure would never change regardless of changes of load. Thus, if the turbines were of such characteristics as to follow in exact unison at all loads, and if the induced and forced draft fans were of identical characteristics, the effect of any change of load would be merely to speed up or slow down both turbines together without making any variation whatever in the furnace pressure. However, because of unavoidable differences in the characteristics of the fans and turbines and also because of variations in the fire bed, the furnace pressure cannot practically be maintained at an exactly constant value by the means heretofore described.

Accordingly, the present invention provides a furnace pressure control operating primarily to vary the division of the power supplied to the two turbines. This control is directly connected with the nozzles of the forced draft turbine and by controlling them, varies the back pressure on the induced draft turbine and therefore varies the proportionate amounts of power taken by the two turbines. The furnace pressure control is mechanically independent of the nozzles of the induced draft turbine.

Referring to the drawing, a spring loaded diaphragm 54 is provided which connects with the combustion chamber of the furnace by a tube 56. The diaphragm is adapted to assume a definite position for each particular furnace pressure. The diaphragm is connected with a pilot regulator 58 in the same manner as the connection of the diaphragm 30 with the pilot regulator 32. The regulator 58 is associated with a cylinder 60 having a piston 62 attached to a connecting rod 64 which is connected to the casing on the regulator. The rack 27 is formed on the connecting rod 64.

It will be noted that the rack and gear connections for the second turbine are reversed with respect to the connections for the first turbine; that is, while an upward movement of the piston 48 acts to shut off nozzles of the induced draft turbine, an upward movement of the piston 62 acts to open nozzles of the forced draft turbine.

Opening of the valves of the forced draft turbine produces the paradoxical effect of slowing the forced draft turbine and speeding up the induced draft turbine. As has already been stated, the quantity of steam passing through the system is fixed by the aggregate throat area of the nozzles of the induced draft turbine. Therefore, opening of the nozzles of the forced draft turbine does not increase the total quantity of steam flowing through the system, but rather does have the effect of diminishing the total steam pressure drop through the forced draft turbine and increasing the steam pressure drop through the induced draft turbine, the total drop through the system being unchanged. In other words, the back pressure on the induced draft turbine is decreased. Consequently, the induced draft turbine develops more power and the forced draft turbine develops less power, but the total power supplied to both turbines is practically unchanged. The result is that the total volume of air handled by the two fans is unchanged, but the induced draft fan does an increased amount of work at the expense of the forced draft fan. This reduces the pressure in the combustion chamber and the fans operate on a new equilibrium position under such conditions as to maintain the furnace pressure at its proper value.

Similarly, a decrease in furnace pressure operates the regulator to close nozzles of the forced draft turbine, increasing the back pressure on the induced draft turbine, thereby increasing the power supplied to the forced draft fan and diminishing the power supplied to the induced draft fan until the furnace pressure builds up to its proper value.

When the turbines are operated as in the preferred case so that the back pressure on the induced draft turbine is always less than the critical pressure, the variations of pressure in the combustion chamber are never very great and the furnace pressure control operates almost immediately to restore the furnace pressure to its predetermined value whenever incidental variations tend to occur.

The furnace pressure control, however, is effective to maintain a substantially constant furnace pressure, even though the preferred construction is not employed. Thus, if the steam pressure at a point between the turbines is greater than 58% of the initial steam pressure, every variation of load tending to open or close nozzles of the induced draft turbine will not only vary the total power supplied to both turbines, but will also vary the proportion of power supplied to them, thereby varying the furnace pressure. A greater duty is laid on the furnace pressure control to restore the furnace pressure conditions to normal and it will be noted that under these conditions, the total power supplied to the system will be varied by operation of the furnace pressure control because the variations in the forced draft turbine nozzles will have an effect on the total power supplied to the system. A balance, however, will eventually be obtained, even though in a less rapid manner than in the preferred system.

In the preferred form of the invention as shown in the drawing, the induced draft turbine may run on any number of nozzles from one to six. The forced draft turbine, because of its low pressure drop, receives steam at all times through the nozzles connected with the manifold 14, the control being entirely on the six nozzles 16. The induced draft turbine is designed for full load operation with all six nozzles in service. The forced draft turbine is designed for full load operation with only three of the nozzles 16 in addition to the continuously supplied nozzles 14. The other three nozzles of the controlled set are provided to permit the cutting in of additional nozzles for varying the back pressure on the induced draft turbine. Inasmuch as the greater part of the steam passes in any case through the manifold nozzles, the variations in back pressure occasioned by operation of the controlled nozzles are not great.

In the case specified, the back pressure on the induced draft turbine may vary ten pounds either way from the average of eighty-five pounds, a variation which has been found sufficient to bring about the proper division of power for maintenance of constant furnace pressure under all conditions.

In the event that the advantages of operation below the critical pressure are not availed of, a greater range of control on the forced draft turbine nozzles might be necessary but the operation in any case follows the principles outlined above.

Although the preferred connection of turbines is as above described, namely, with the induced draft turbine on the high pressure end and the forced draft turbine on the low pressure end, the connections may be reversed if desired. In general, it is desirable that the turbine which is to take the greater load shall be the first turbine and if for any reason, the forced draft turbine should operate under the greater load, it may be connected for operation on the high pressure steam.

It will be understood that excessive throttling of the steam at any point is not desirable. Inasmuch as the division of power between the two turbines is determined by the division of the steam pressure drops through the turbines, it will be evident that throttling as a predominant control would not be effective because of the fact that the pressure drop through the throttling valve would be a drop separate and apart from any pressure drops existing in the turbine nozzles themselves. Accordingly, each turbine is preferably provided with a sufficient number of nozzles so that variations of power may be effected as closely as possible by cutting nozzles entirely into or out of service.

In order that a nice control may be attained with a reasonably small number of nozzles, however, some throttling may be permitted on one nozzle. Thus, in the illustrated embodiment of the invention, the cams operate to throttle only on the last nozzle placed in service, all other nozzles operating in the full open position. Such slight throttling as occurs in only one of the valves has no appreciable effect on the automatic controls.

From the foregoing description, it will be understood that the present invention affords a compounded turbine drive system for induced and forced draft fans, in which means acting in accordance with variations of load on the plant are provided to vary the total power supplied to both turbines and hence to vary the total draft, and additional means are provided acting upon variations of furnace pressure to vary the division of power between the turbines to restore a predetermined pressure in the combustion chamber.

In its preferred form, the two controls operate practically independently, that is to say, the first operates to vary the total power supplied to the system without varying the proportion of loads taken by the two turbines, and the second operates to vary the division of power without appreciably varying the total power. In other words, the steam pressure controls the turbines with unison effects, and the furnace pressure controls them with opposition effects. In this preferred form, restoration of pressures to their normal values takes place in a minimum time and with minimum operation of the control mechanism.

Although the invention as herein illustrated and described embodies a control acting upon the steam pressure to maintain the steam pressure at a nearly constant value, it will be understood that any devices acting in accordance with changes in the load on the plant may be employed for the purpose of controlling the nozzles of the first turbine. The control by variations in steam pressure is convenient and satisfactory. It will be evident that the control should operate in accordance with general variations in the plant load but should not be too sensitive to momentary fluctuations in load. The control by the steam pressure meets these conditions satisfactorily because, for example, a continued increase in the load on the plant eventually results in a drop in boiler pressure, which drop in boiler pressure then operates to speed up the draft apparatus and restore the pressure to normal; whereas a momentary fluctuation in load is readily taken care of by the reserve of steam in the boilers without producing an immediate effect upon the draft.

It will be noted that the controls will operate to maintain the predetermined steam and furnace pressures, even when the back pressure on the second turbine varies. The exhaust steam from the second turbine is utilized principally for heating feed water. The back pressure will vary with the amount of heat necessary to be abstracted from the exhaust steam in the feed water heater. Under conditions of high plant load, the back pressure will increase, and this not only diminishes the total power of the system to some extent, but also varies the division of power between the turbines, resulting in a greater proportionate reduction of power for the forced draft turbine than for the induced draft turbine. The change in division of power is immediately reflected in a reduction of furnace pressure, which operates through the furnace pressure control to restore the proper division of power and thus to restore the proper furnace pressure at once. The change in total or overall power of the turbine system is eventually reflected in a slight drop of boiler pressure, which then acts through the steam pressure control to increase the power supplied to the turbines until the steam pressure rises to the proper value. Therefore, in any case, whether through variations in plant load, or through incidental variations in steam pressures outside the system, the present invention provides for maintenance of boiler and furnace pressure at their predetermined values.

Having thus described the invention, what is claimed is:

1. In a mechanical draft system for a furnace, the combination with induced and forced draft turbines, of automatic means for simultaneously varying the power supplied to both turbines to vary the total draft, and means for varying the division of power supplied to the turbines to control the furnace pressure.

2. In a mechanical draft system for a furnace, the combination with compounded induced and forced draft turbines, of means adapted to be operated by the demand on the furnace for varying the total power supplied to both turbines, and means controlled by the furnace pressure for varying the division of power supplied to the turbines to maintain a substantially constant furnace pressure.

3. In a mechanical draft system for a furnace, the combination with compounded induced and forced draft turbines, each having means for cutting nozzles into and out of service, of means for varying the steam supplied to both turbines to vary the draft, and means for varying the division of power supplied to the turbines for controlling the furnace pressure, said last-mentioned means operating to cut into or out of service nozzles of the second turbine.

4. In a mechanical draft system for a furnace, the combination with compounded induced and forced draft turbines, each having means for cutting nozzles into and out of service, of means for varying the total power supplied to the turbines for varying the total draft, and furnace pressure control means for operating on the forced draft turbine to cut nozzles out of service when the furnace pressure is lower than a predetermined value and to cut nozzles into service when the furnace pressure is above a predetermined value, whereby the division of load between the turbines is varied to restore the furnace pressure to its normal value.

5. In a mechanical draft system for a furnace, the combination with compounded induced and forced draft turbines, each having means for cutting nozzles into and out of service, of means for varying the total power supplied to the turbines for varying the draft, and means operated by variations in furnace pressure for varying the division of load between the turbines to maintain a substantially constant furnace pressure, said last mentioned means operating to cut nozzles of the forced draft turbine into service to decrease the furnace pressure, and vice versa.

6. In a mechanical draft system for a furnace, the combination with compounded induced and forced draft turbines, of means for varying the steam supplied to both turbines for varying the draft, and means for varying the steam pressure drops through the separate turbines to vary the division of power between them and thereby to vary the furnace pressure.

7. In a mechanical draft system for a boiler furnace, the combination with compounded induced and forced draft turbines, of a diaphragm sensitive to changes in steam pressure for admitting variable quantities of steam to both turbines in series, and a diaphragm sensitive to variations in furnace pressure for varying the steam pressure drops through both turbines to vary the division of power between them.

8. In a mechanical draft system for a boiler furnace, the combination with compounded induced and forced draft turbines, of a steam pressure control for varying the power supplied to the turbines, and means operated by variations in the furnace pressure for varying the power supplied to one of the turbines to restore the furnace pressure to a predetermined value.

9. In a mechanical draft system for a furnace, the combination with compounded induced and forced draft turbines, each having provision for cutting nozzles into and out of service, of control means for operating the nozzles of one of the turbines to vary the draft, and furnace pressure control means for operating the nozzles of the other of the turbines to maintain a substantially constant furnace pressure.

10. In a mechanical draft system for a furnace, the combination with compounded induced and forced draft turbines, of means for varying the power supplied to both turbines to vary the total draft while maintaining the furnace pressure constant, and means for varying the division of power supplied to the turbines to vary the furnace pressure while maintaining the total draft constant.

11. In a mechanical draft system for a furnace, the combination with compounded induced and forced draft turbines, of means for increasing the effective inlet area of the forced draft turbine to reduce the back pressure on the induced draft turbine and thereby increase its output.

12. In a mechanical draft system for a furnace, the combination with compounded induced and forced draft turbines, of means for simultaneously varying the power supplied to both turbines without substantially affecting the division of power between the turbines to vary the total draft, and means for carrying the division of power supplied to the turbines without appreciably affecting the total power to control the furnace pressure.

13. In a mechanical draft system for a furnace, the combination with compounded induced and forced draft turbines, of means controlled by the demand on the furnace for varying the power supplied to the turbines in unison, and means controlled by variations in the furnace pressure for varying the power supplied to the turbines in opposition.

14. In a mechanical draft system for a furnace, the combination with compounded induced and forced draft turbines, of means controlled by demand on the furnace for varying the inlet area of the high pressure turbine, and means controlled by furnace pressure for varying the inlet area of the low pressure turbine to restore the furnace pressure to a predetermined value.

15. In a mechanical draft system for a furnace, the combination with compounded induced and forced draft turbines, of means for operating the high pressure turbine with a back pressure on its nozzles less than 58% of the initial pressure, means for varying the inlet area of the high pressure turbine to vary the power supplied to both turbines without appreciably affecting the division of power between the turbines to vary the total draft, and means for varying the inlet area of the low pressure turbine to vary the division of power supplied to the turbines without appreciably varying the total power to control the furnace pressure.

16. In a mechanical draft system for a furnace, the combination with compounded induced and forced draft turbines, of means for varying the power supplied to both turbines without appreciably affecting the division of power between them for varying the total draft, and means for varying the steam pressure between the turbines independently of the initial and exhaust pressures of the system to vary the division of power without appreciably affecting the total power for varying the furnace pressure.

17. In a mechanical draft system for a boiler furnace, the combination with compounded induced and forced draft turbines, of means controlled by variations in steam pressure for varying the total power supplied to the turbines without appreciably affecting the division of power between them to restore the steam pressure to a predetermined value, and means controlled by the furnace pressure for varying the division of power between the turbines without appreciably affecting the total power to restore the furnace pressure to a predetermined value.

18. In a mechanical draft system for a boiler furnace, the combination with compounded induced and forced draft turbines, of means controlled by variations in the steam pressure for speeding up or slowing down both turbines together, and means controlled by the furnace pressure for increasing the speed of one turbine while decreasing the speed of the other.

19. In a mechanical draft system for a boiler furnace, the combination with compounded induced and forced draft turbines, each having provision for variation of inlet area, of means controlled by the steam pressure for varying the inlet area of the induced draft turbine, and means controlled by the furnace pressure for varying the inlet area of the forced draft turbine.

20. In a mechanical draft system for a furnace, the combination with compounded induced and forced draft turbines, each having provision for varying the aggregate nozzle area, the low pressure turbine being adapted to work at an initial steam pressure less than 58% of the initial pressure on the induced draft turbine, of means for varying the nozzle area of the induced draft turbine to vary the total power supplied to both turbines without appreciably affecting the division of power between them, and means for varying the inlet area of the forced draft turbine to vary the division of power between the turbines without appreciably affecting the total power.

21. In a mechanical draft system for a boiler furnace, the combination with compounded induced and forced draft turbines, of means controlled by the steam pressure for varying the inlet area of the high pressure turbine, and means controlled by the furnace pressure for varying the inlet area of the low pressure turbine whereby an increase in inlet area of the low pressure turbine decreases the speed of the low pressure turbine and increases the speed of the high pressure turbine, and vice versa.

22. In a mechanical draft system for a furnace, the combination with compounded induced and forced draft turbines, the low pressure turbine being adapted to operate at a pressure less than 58% of the initial pressure, of means for varying the inlet area of the high pressure turbine to vary the total draft, and means for varying the inlet area of the low pressure turbine to control the furnace pressure.

23. In a mechanical draft system for a furnace, the combination with compounded induced and forced draft turbines, of means for varying the total power supplied to both turbines to vary the draft, and means for varying the division of power supplied to the turbines to vary the furnace pressure.

24. The method of operating compounded induced and forced draft turbines which consists in varying in unison the power supplied to both turbines to control the total draft, and varying in opposition the power supplied to the turbines to control the furnace pressure without appreciably varying the total draft.

25. The method of operating compounded induced and forced draft turbines which consists in varying the inlet area of the high pressure turbine to control the total draft, and varying the inlet area of the low pressure turbine to control the furnace pressure without appreciably varying the total draft.

26. The method of operating compounded induced and forced draft turbines which consists in supplying steam to the low pressure turbine at a pressure less than 58% of the initial pressure, varying the inlet area of the high pressure turbine to control the total draft without appreciably varying the division of power, and varying the inlet area of the low pressure turbine to vary the division of power without appreciably varying the total power.

27. The method of operating compounded induced and forced draft turbines on a boiler furnace which consists in operating the low pressure turbine at a pressure less than 58% of the initial pressure, increasing the inlet area of the high pressure turbine on a decrease of steam pressure and vice versa to vary the power supplied to both turbines in unison, and varying the inlet area of the low pressure turbine in accordance with changes in the furnace pressure to vary the division of power between the turbines.

28. The method of operating compounded induced and forced draft turbines which consists in varying the total draft by variation in the steam supplied to the turbines while maintaining the ratio of pressure drops in the turbines substantially constant, and in varying the furnace pressure by variation in the ratio of pressure drops in the turbines while maintaining the steam supplied substantially constant.

29. In a mechanical draft system for a boiler furnace, the combination with induced and forced draft fan drives, of means sensitive to steam pressure for varying the power supplied to both drives in unison to vary the total draft, and means operated by variations in the furnace pressure for increasing the power supplied to one drive and decreasing the power supplied to the other drive to restore the furnace pressure to a constant value.

30. The method of controlling a mechanical draft system for a boiler furnace having forced and induced draft fan drives which consists in varying the power supplied to both drives in unison to vary the total draft, and maintaining the furnace pressure at a substantially constant value by varying the division of power between the drives upon variations in furnace pressure.

In testimony whereof I have signed my name to this specification.

OLIVER D. H. BENTLEY.

CERTIFICATE OF CORRECTION.

Patent No. 1,888,485. November 22, 1932.

OLIVER D. H. BENTLEY.

It is hereby certified that error appears in the printed specification of the above numbered patent requiring correction as follows: Page 6, line 22, claim 12, for "carrying" read "varying"; and that the said Letters Patent should be read with this correction therein that the same may conform to the record of the case in the Patent Office.

Signed and sealed this 17th day of January, A. D. 1933.

(Seal)

M. J. Moore,
Acting Commissioner of Patents.